United States Patent
Höring

(10) Patent No.: US 7,946,190 B2
(45) Date of Patent: May 24, 2011

(54) SHIFT ROCKER ARRANGEMENT FOR A SHIFT TRANSMISSION

(75) Inventor: Gerhard Höring, Hagnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 468 days.

(21) Appl. No.: 12/089,119

(22) PCT Filed: Sep. 26, 2006

(86) PCT No.: PCT/EP2006/009335
§ 371 (c)(1),
(2), (4) Date: Apr. 3, 2008

(87) PCT Pub. No.: WO2007/048476
PCT Pub. Date: May 3, 2007

(65) Prior Publication Data
US 2008/0216595 A1    Sep. 11, 2008

(30) Foreign Application Priority Data

Oct. 27, 2005  (DE) .................. 10 2005 051 383

(51) Int. Cl.
*B60K 20/00* (2006.01)
(52) U.S. Cl. .................. 74/473.37; 74/473.1; 74/473.36
(58) Field of Classification Search .................. 74/335, 74/337.5, 473.1, 473.27, 473.3, 473.36, 473.37; 384/192, 206
See application file for complete search history.

(56) References Cited

U.S. PATENT DOCUMENTS

| 4,265,137 | A | * | 5/1981 | Johannesson et al. | ....... 74/473.1 |
| 4,579,010 | A | * | 4/1986 | Colvin et al. | .................. 74/7 A |
| 4,649,285 | A | * | 3/1987 | Mazzorana et al. | ........... 290/48 |
| 4,716,779 | A | | 1/1988 | Heinzelmann | |
| 5,341,697 | A | * | 8/1994 | Isozumi | ......................... 74/7 A |
| 5,469,753 | A | * | 11/1995 | Vadin-Michaud et al. | ..... 74/7 A |
| 6,347,556 | B1 | | 2/2002 | Nitzschke et al. | |
| 6,761,087 | B2 | * | 7/2004 | Blanchard | .................. 74/606 R |

FOREIGN PATENT DOCUMENTS

| DE | 1 057 637 | 5/1959 |
| DE | 25 47 476 | 3/1977 |
| DE | 29 12 117 | 10/1979 |
| DE | 36 34 291 A1 | 4/1988 |
| DE | 197 53 728 A1 | 6/1999 |
| DE | 102 52 191 A1 | 6/2004 |
| GB | 2 017 841 A | 10/1979 |
| GB | 1 570 759 | 7/1980 |
| GB | 2 200 968 A | 8/1988 |
| WO | WO-86/03858 | 7/1986 |

* cited by examiner

*Primary Examiner* — Richard W Ridley
*Assistant Examiner* — Matthew A Johnson
(74) *Attorney, Agent, or Firm* — Davis & Bujold, P.L.L.C.

(57) ABSTRACT

A shift rocker arrangement for a transmission including a two-arm bracket shift rocker that extends around a transmission element to be shifted and is supported by pivot bearings on the arms of the bracket within a transmission housing to pivot about an axis located essentially in the plane of the bracket. The shift rocker has bearing elements formed on the bracket arms and complementary bearing shells are formed on the inside wall of the closed housing. The bearing shells that support the bearing elements of the shift rocker are either formed on a bearing bar, which is supported at both ends by the housing, or they are formed directly on inside walls of the housing.

10 Claims, 4 Drawing Sheets

SHIFT ROCKER ARRANGEMENT FOR A SHIFT TRANSMISSION

This application is a national stage completion of PCT/EP2006/009335 filed Sep. 26, 2006, which claims priority from German Application Serial No. 10 2005 051 383.2 filed Oct. 27, 2005.

FIELD OF THE INVENTION

The invention concerns a shift rocker arrangement for a shift transmission.

BACKGROUND OF THE INVENTION

Such shift rocker arrangements are generally known. They are actuated by shift rails which engage in the apex area of the bracket-like shift rocker. At the ends of the bracket arms of the shift rocker are arranged slide blocks, which engage in circumferential grooves of a shift sleeve to be moved or shifted axially.

From WO 86/03858 a shift rocker arrangement is already known in which the shift rocker is mounted to pivot on pivot pins which are inserted from outside through corresponding through-bores in the wall of the transmission housing and project into the inside of the transmission housing. These pivot pins engage in pin sockets formed in the bracket arms of the shift rocker.

A disadvantage of this known design is considered to be that the pivot pins inserted through the housing wall create sealing points that have to be sealed with sealing elements, this always carries the risk that over a prolonged period of use the sealing points may develop leaks so that transmission oil present in the transmission housing can escape. A further disadvantage of the known design is that in the area of the pivot pins inserted through the wall of the housing, the housing wall must be made very strong so as to be able to withstand the forces acting on the pivot pins. This results in the cast housings having a higher cost for the design and production of the casting.

Against that background, the purpose of the present invention is to provide a shift rocker arrangement in which there is no need for bores that pass through the wall of the housing so that the associated disadvantages described above are avoided.

SUMMARY OF THE INVENTION

The invention is based on the knowledge that transmission housings are generally of divided structure, being split into a main housing portion and a housing cover so that the inside of the housing is accessible, which makes it possible to provide bearing elements for the mounting of the at least one shift rocker directly on the inside wall of the housing without having to drill through or form apertures in the housing wall.

Accordingly, the invention begins with a shift rocker arrangement for a shift transmission, comprising a shift rocker in the form of a two-arm bracket which surrounds a transmission element to be shifted, which is mounted by way of pivot bearings arranged on the bracket arms so as to pivot about a pivot axis located essentially in the plane of the bracket inside a transmission housing.

To achieve the stated objective, it is provided that the shift rocker is mounted by way of bearing elements formed on the bracket arms and complementary bearing elements provided on the inside wall of the closed housing.

Thanks to the design of the bearing elements and complementary bearing elements, there is no need for bores that pass through the housing wall. The fact that the transmission housing is divided into a main housing portion and a housing cover can be used to particularly good effect for the assembly of the shift rocker in the transmission housing since, when the housing cover is being put into place, a pivot pin is inserted into a pin socket as will be explained in more detail with reference to example embodiments.

Basically, the bearing elements and complementary bearing elements can be of any suitable design. A particularly suitably designed embodiment of the invention provides that the bearing elements formed on the bracket arms are, in each case, formed as pivot-pin-like bearing surfaces on the bracket arms, which are fitted into pin sockets provided on the inside wall of the transmission housing.

Since the pivoting angles of the shift rockers are generally comparatively small, for example less than 30°, it suffices for the bearing elements and the complementary bearing elements to be formed such that they only allow a pivoting angle of about such size. This restriction enables a particularly appropriate design in which two respective circular-section-like, wider portions are formed laterally on the bracket arms in a plane perpendicular to the pivot axis, whose circumferential faces from the bearing surfaces and the pin sockets are formed by bearing shells complementary to the bearing surfaces, but surrounding them only partially such that the part of the circumferential faces not surrounded by the bearing shells defines the possible pivot angle as will be explained with reference to an example embodiment.

In a particularly appropriate design of the invention, especially in terms of assembly technique, in each case, the pin sockets are formed on a bearing bar that extends perpendicularly to a plane dividing the transmission housing between the main housing portion and a housing cover and whose ends are mounted in the main housing portion and in the housing cover.

The shift rocker is then assembled by positioning the bearing bar with its pin sockets on the pivot-pin-like bearing surfaces of the bracket, then inserting the shift rocker with the bearing bar into the housing so that the ends of the bearing bar on the housing side are introduced into associated sockets in the housing, and then putting on the housing cover so that the ends of the bearing bar on the housing cover side are introduced into associated sockets in the housing cover. For that purpose, pivot pins are preferably formed at each end of the bearing bar, which engage in associated pin sockets on the inside of the housing and of the cover, respectively.

According to another embodiment of the invention, in the area of the pin sockets, the transmission housing is divided along a parting plane essentially parallel to the plane containing the pivoting axis and one respective bearing shell of each pin socket is formed directly on the inside wall of the housing and the other bearing shell is formed on the inside wall of the housing cover.

The shift rocker is then assembled by placing the pivot-pin-like bearing surfaces formed on the bracket arms in the bearing shell formed on the inside wall of the housing, and then putting on the cover so that the bearing shell formed on the inside wall of the housing cover also rests against the associated bearing surface of the shift rocker as will be explained with reference to a further embodiment of the invention.

In the embodiment with the bearing bars that form the pin sockets, to avoid misfits that result from different thermal expansions, the bearing bars are made from the same material as the transmission housing and the housing cover.

BRIEF DESCRIPTION OF THE DRAWINGS

The invention will now be described, by way of example, with reference to the accompanying drawings in which.

DETAILED DESCRIPTION OF THE INVENTION

Figure 1:
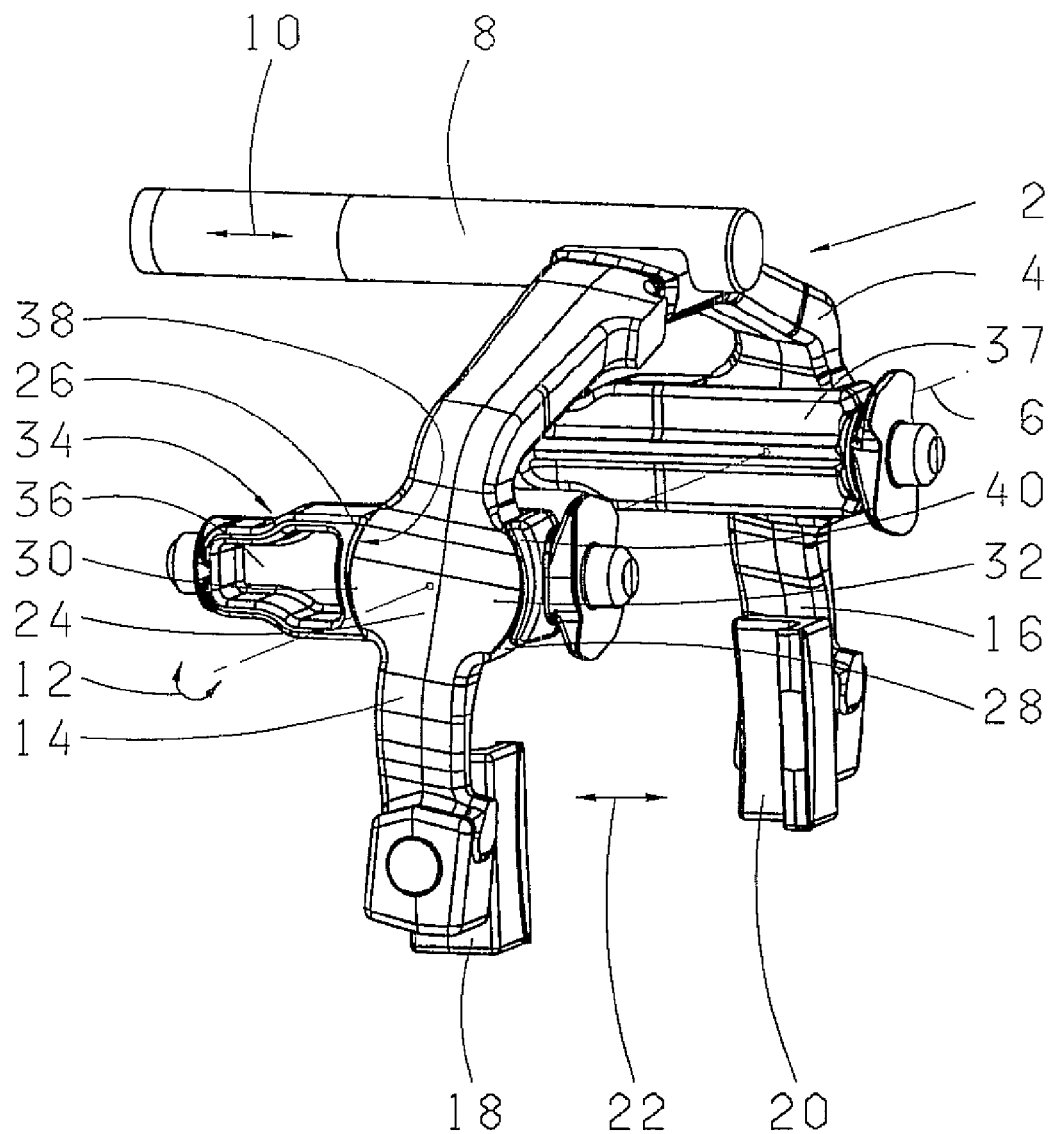
FIG. 1 is a perspective view of a shift rocker mounted on two bearing bars arranged in the transmission housing.

A shift rocker arrangement 2, shown in FIG. 1, comprises a shift rocker 4 in the form of a two-arm bracket that fits around a transmission element (not shown) that is to be shifted, for example a clutch sleeve. The bracket is mounted to pivot about a pivot arm 6 located substantially in the plane of the bracket within a transmission housing (also not shown). A shift rail 8 is engaged in the apex area of the shift rocker and can be displaced axially, either manually or by way of a shift drive in the direction of a double arrow 10, where the shift rocker 4 pivots in the direction of a double arrow 12.

At the ends of bracket arms 14, 16 are arranged slide blocks 18 and 20, respectively, which engage with the transmission element to be shifted and displace it in the direction of the double arrow 22.

On each of the bracket arms 14, 16 is formed a bearing element 24, which is mounted in a complementary bearing element 34 provided on the inside wall of the housing. Below, the bearing element 24 and its associated complementary bearing element 34 will be explained in more detail in relation to the bracket arm 14. The bearing element 24 and complementary bearing element 34 associated with the bracket arm 16 are, in each case, of identical structure and will therefore not be described in detail.

The bearing element 24 formed on the bracket arm 14 consists of pivot-pin-like bearing surfaces 26 and 28 formed on the bracket arm 14. For this, in a plane perpendicular to the pivot arm 6, two respective circular-section-like, wider areas 30 and 32 are formed laterally on the bracket arm 14, whose circumferential faces constitute the respective bearing surfaces 26 and 28.

The bearing element 24 is mounted in the associated complementary bearing element 34 as a whole, which will be described in detail below. The complementary bearing element 34 comprises a bearing bar 36, which is arranged in the transmission housing, in a manner described in more detail with reference to FIG. 2, and which corresponds to a second bearing bar 37 associated with the second bracket arm 16.

Two bearing shells 38 and 40, respectively, are formed on the bearing bar 36, complementary to the bearing surfaces 26, 28, which enclose the associated bearing surfaces 26, 28. Thus, bearing shells 38, 40 form a pivot socket for the pivot-pin-like bearing element 24. In each case, the bearing shells 38, 40 only partially enclose the bearing surfaces 26, 28 so that the part of the bearing surfaces 26, 28 not surrounded by the bearing shells 38, 40 defines the possible pivoting angle of the shift rocker 4.

Figure 2:
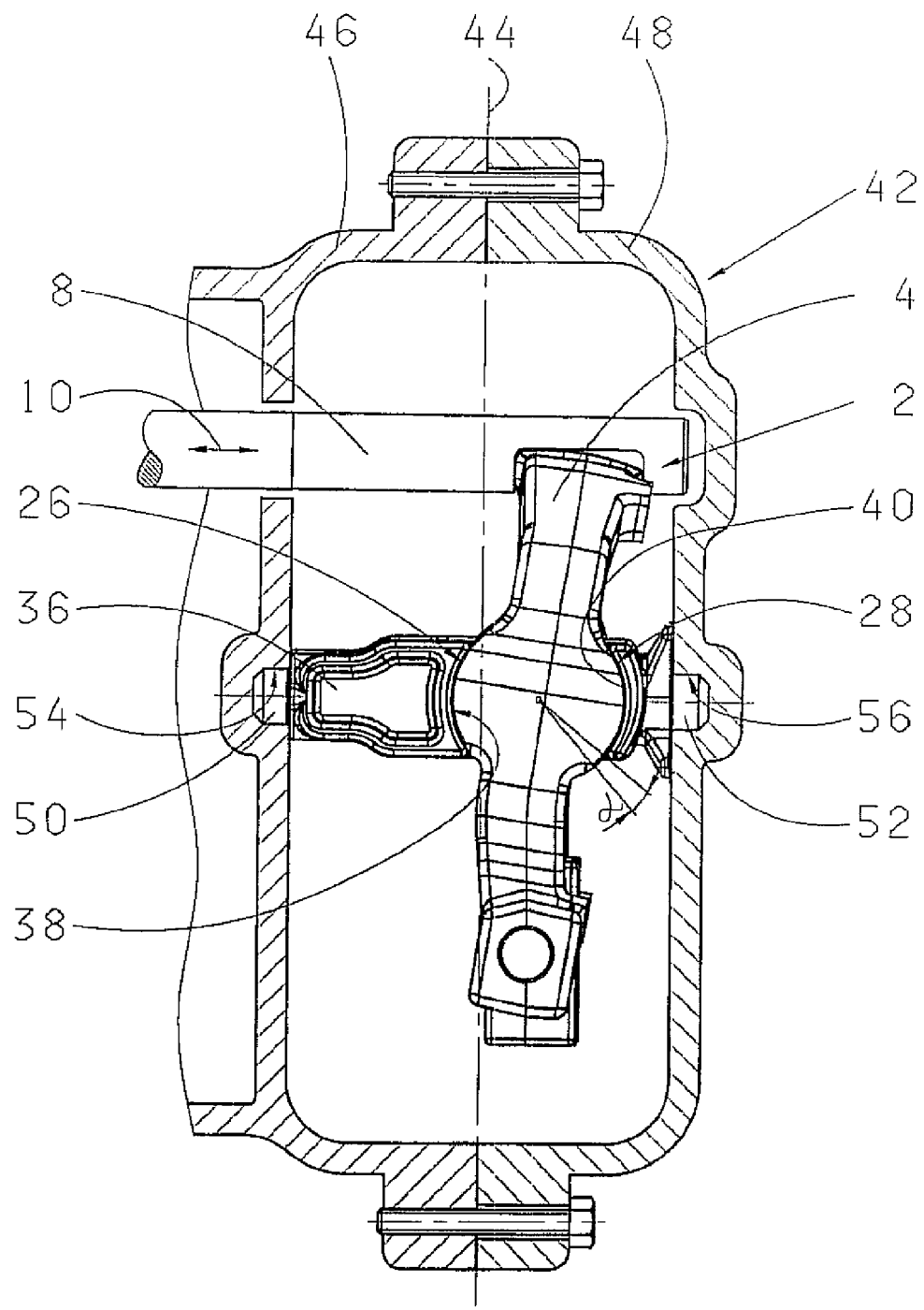
FIG. 2 is a longitudinal section through a transmission housing with a shift rocker as in FIG. 1.

FIG. 2 shows the shift rocker arrangement 2 of FIG. 1. This FIG. 2 illustrates, in particular, how the bearing bar 36 is mounted in a transmission housing 42 as a whole. The transmission housing 42 is split along a parting plane 44 essentially parallel to a plane that contains the pivot axis 6, the part of the housing to the left of the parting plane 44 being referred to as a main housing portion 46 and the part to the right of the parting plane 44 being referred to as a housing cover 48.

The bearing bar 36 extends substantially perpendicularly to the parting plane 44 along a housing wall that encloses the shift rocker 4 laterally as can be seen clearly in FIG. 2. At the ends of the bearing bar 36 are in each case formed bearing pins 50 and 52, the bearing pin 50 facing the main housing portion 46 being fitted into a pin socket 54 on the inside of the housing 46 and the bearing pin 52 facing the housing cover 48 being fitted into a pin socket 56 on the inside of the cover 48.

To assemble the shift rocker arrangement 2, the two bearing bars 36 and 37 are first put onto their associated bracket arms 14 and 16, respectively, so that the bearing elements 24 and complementary bearing elements 34 are together. Then the structural unit, consisting of the shift rocker 4 and the bearing bars 36, 37, is inserted into the open transmission housing 42 in such a manner that the bearing pin on the housing side 46 engages in the associated socket 54. Then the housing cover 48 is placed onto the main housing 46 in such manner that the bearing pin 52 on the cover side 48 engages in the associated pin socket 56. The bearing bars 36 and 37 are then fixed in their assembled position by bolting the housing cover 48 to the main housing 46.

As can also be seen in FIG. 2, the bearing shells 38 and 40 formed on the bearing bar 36, only partially surround the associated bearing surfaces 26 and 28 so the part of the bearing surfaces 26, 28 not surrounded by the bearing shells 38, 40 defines the possible pivoting angle α.

Figure 3:
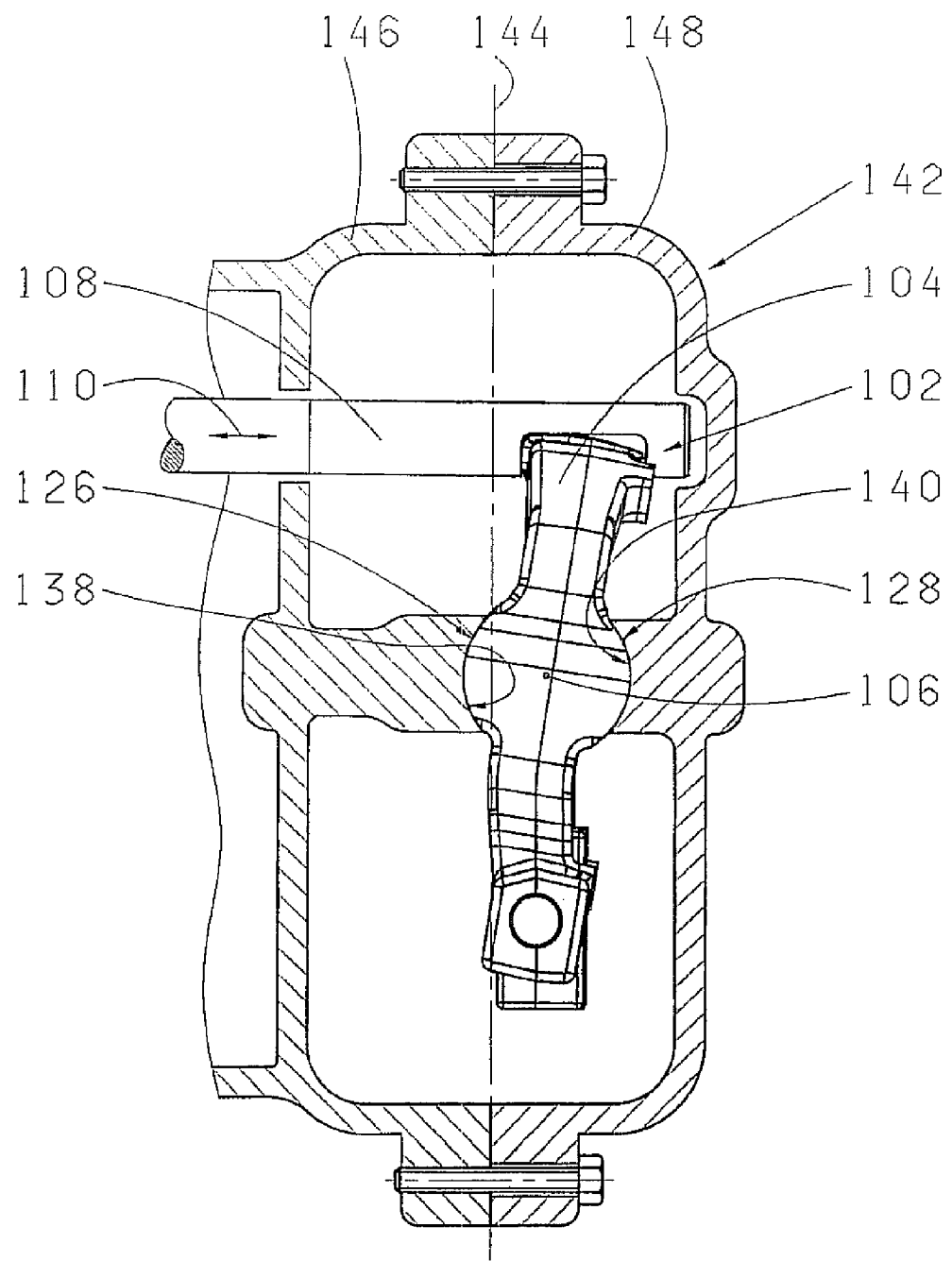
FIG. 3 is a longitudinal section through a transmission housing with a shift rocker mounted directly in bearing shells formed on the inside wall of the housing.

FIG. 3 shows a shift rocker arrangement 102, similar to the shift rocker arrangement 2 shown in FIG. 2. The components in FIG. 3 are equivalent to those in FIG. 2 and indexed with the same numbers increased by 100. A shift rocker 104 is formed in the same way as the shift rocker 4 so it need not be described in detail again. In contrast to FIG. 2, bearing shells 138, 140, respectively associated with bearing surfaces 126 and 128 are not arranged on a separate bearing bar, but are formed directly on the inside wall of a main housing 146 and a housing cover 148, as seen in FIG. 3. In this way, one respective bearing shell 138 is associated with the main housing portion 146 and the other bearing shell 140 with the housing cover 148. By placing the housing cover 148 onto the main housing portion 146, the two bearing shells 138, 140 become a pivot socket for the bearing element formed on the bracket arm of the shift rocker 104.

To assemble the shift rocker arrangement 102, the shift rocker 104 is placed in an open transmission housing 142 in such manner that the bearing surface 126 rests against the associated bearing shell 138. Then the housing cover 148 is placed onto the main housing portion 146 so that the bearing shell 140, formed on the housing cover 148, rests on the associated bearing surface 128. By bolting the housing cover 148 to the main housing 146, the shift rocker 104 is fixed in its assembled position and can pivot within the transmission housing 142.

Figure 4:
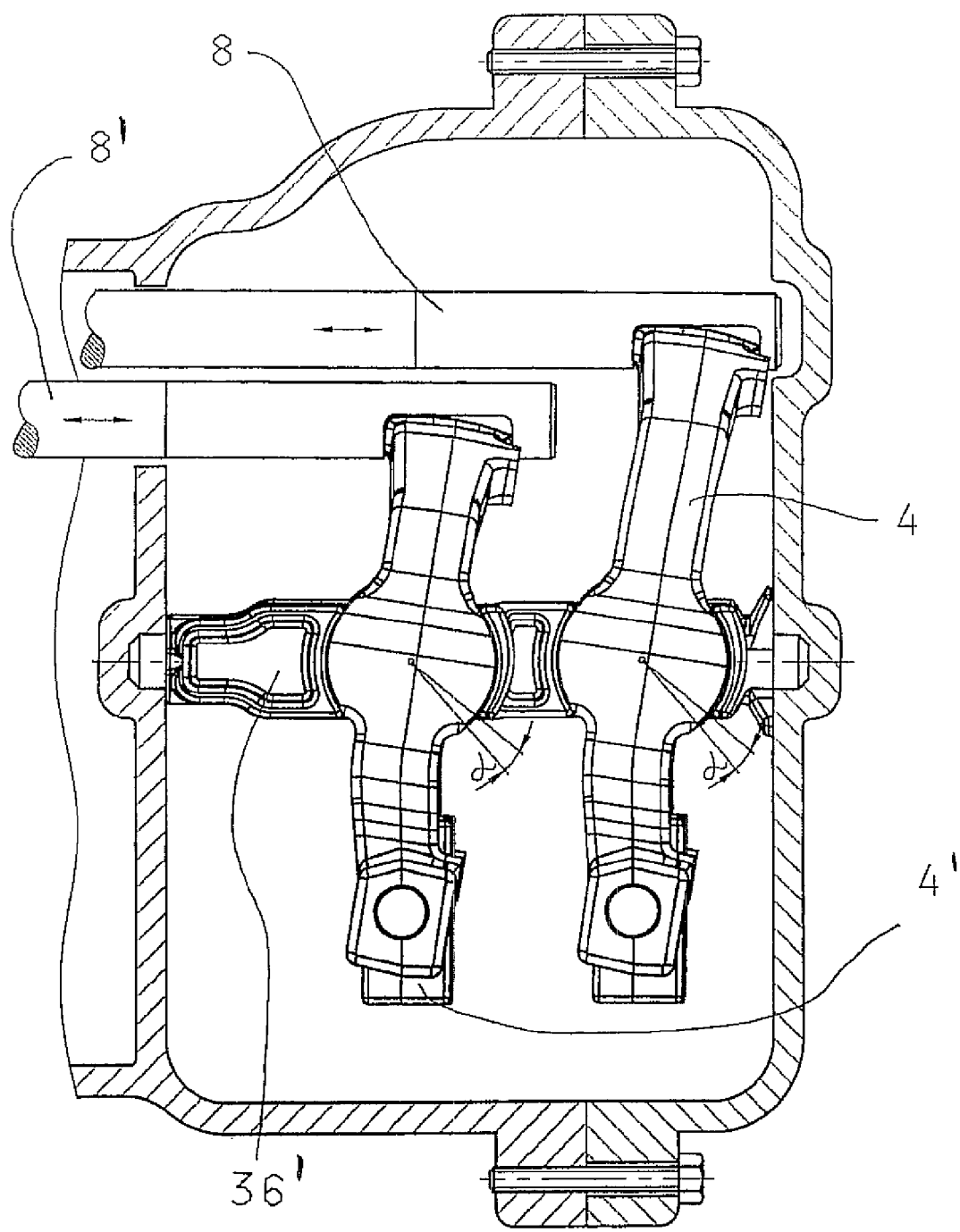
FIG. 4 is a longitudinal section through a transmission housing with two shift rockers.

FIG. 4 shows an arrangement, according to FIG. 2, in which, besides the shift rail 8, a second shift rail 81 is provided, such that a second shift rocker 41 can be actuated. The two shift rockers 4 and 4' are mounted to pivot in a common bearing bar 36'. In a manner similar to that in which two shift rockers 4 and 4' are arranged here, a larger number of shift rails can also be arranged. For this, a corresponding number of bores must be provided in a bearing bar of appropriate length.

| Reference numerals | |
|---|---|
| 2 | shift rocker arrangement |
| 4, 4' | shift rocker |
| 6 | pivot arms |
| 8, 8' | shift rails |
| 10 | double arrow |
| 12 | double arrow |
| 14 | bracket arm |
| 16 | bracket arm |
| 18 | slide block |
| 20 | slide block |
| 22 | double arrow |
| 24 | bearing element |
| 26 | bearing surface |
| 28 | bearing surface |
| 30 | wider area of circular section |
| 32 | wider area of circular section |
| 34 | complementary bearing element |
| 36, 36' | bearing bar |
| 37 | bearing bar |
| 38 | bearing shell |
| 40 | bearing shell |
| 42 | transmission housing |
| 44 | parting plane |
| 46 | main housing portion |
| 48 | housing cover |
| 50 | bearing pin |
| 52 | bearing pin |
| 54 | pin socket |
| 56 | pin socket |
| 102 | shift rocker arrangement |
| 104 | shift rocker |
| 106 | pivot axis |
| 108 | shift rail |
| 110 | double arrow |
| 126 | bearing surface |
| 128 | bearing surface |
| 138 | bearing shell |
| 140 | bearing shell |
| 142 | transmission housing |
| 144 | parting plane |
| 146 | main housing portion |
| 148 | housing cover |

The invention claimed is:

1. A shift rocker arrangement (2), for a shift transmission, comprising a shift rocker (4) having a bracket with two-arms (14, 16) that extend around a transmission element to be shifted, the bracket being pivotally supported within a transmission housing (42) by pivot bearings to pivot about a pivot axis (6) which is located essentially in a first plane of the bracket that is defined by the bracket arms (14, 16) of the bracket, the pivot bearings comprise bracket bearing elements (24), that are formed on the bracket arms (14, 16), and complementary bearing elements, that are supported on inner walls of the transmission housing, each of the bracket bearing elements (24) includes pivot-pin bearing surfaces (26, 28) that contact bearing shells (38, 40) that form the complementary bearing elements that are supported on the inner walls of the transmission housing (42), in a second plane defined by the bracket arms that is perpendicular to the pivot axis, the bracket bearing elements (24) have two circular-section wider areas (30, 32) that comprise the bearing surfaces (26, 28), and the bearing shells (38, 40) are complementary to and partially surround and encompass the bearing surfaces (26, 28); and the bracket bearing elements (24) are formed on the two arms (14, 16) such that the two arms (14, 16) pass between the bearing shells (38, 40), the bearing shells are respectively formed on a bearing bar (36, 37), one end of the bearing bar is mounted in a main housing portion (46) and an opposite end of the bearing bar is mounted in a housing cover (48), the two arms (14, 16) are fixed to each other such that the shift rocker (4) has a U-shape, and the bearing bars (36, 37) extend from the main housing portion (46) to the housing cover (48) on an inside of the U-shaped shift rocker (4) between the two arms (14, 16).

2. The shift rocker arrangement according to claim 1, wherein the transmission housing (42), formed by the main housing portion (46) and the housing cover (48), is divided by a partitioning plane (44) which extends essentially parallel to the first plane that contains the pivot axis (6), and the bearing bars (36, 37) extend substantially perpendicular to the partitioning plane (44) of the transmission housing (42).

3. The shift rocker arrangement according to claim 2, wherein bearing pins (50, 52) are formed respectively at the ends of the bearing bar (36), the bearing pins engage in associated pin sockets in an inside of the main housing portion (46) and an inside of the housing cover (48).

4. The shift rocker arrangement according to claim 1, wherein, in an area of the bearing shells, the transmission housing, formed by the main housing portion and the housing cover, is divided along a partitioning plane which extends substantially parallel to the first plane containing the pivot axis, and one of the bearing shells is formed directly on an inside wall of the main housing portion, and the other of the bearing shells is formed on an inside wall of the housing cover.

5. The shift rocker arrangement according to claim 2, wherein the bearing bars (36, 37) are made of a same material as the transmission housing (42).

6. A shift rocker arrangement (2) for a shift transmission, the shift rocker arrangement (2) comprising:

a shift rocker (4) having two arms (14, 16) extending around a shiftable transmission element, each of the two arms (14, 16) having a circular pivot bearing (24) with rounded bearing surfaces (26, 28), the two arms (14, 16) and respective circular pivot bearings (24) being aligned to rotate about a pivot axis (6) such that the shift rocker (4) pivots to shift the transmission element;

a transmission housing (42) having a main housing (46) and a housing cover (48), the housing cover (48) being fixed to the main housing (46) along a mating plane (44) to form the transmission housing (42) and enclose the shift rocker (4) and the transmission element;

the main housing (46) supporting a first pair of support surfaces (38), each of which are rounded to match a first of the rounded bearing surfaces (26) of the respective pivot bearings (24) of the two arms (14, 16) and the housing cover (48) supports a second pair of support surfaces (40), each of which are rounded to match a second of the rounded bearing surfaces (28) of the respective pivot bearings (24) of the two arms (14, 16), such that when the housing cover (48) is fixed to the main housing (46) each of the circular pivot bearings (24) of the two arms (14, 16) is sandwiched between and pivotably supported by the first pair of support surfaces (38) and the second pair of support surfaces (40) with the pivot axis (6) being parallel to the mating plane (44); and the circular pivot bearings (24) of the two arms (14, 16) are aligned with the two arms (14, 16) such that the two arms (14, 16) pass between the first pair of support surfaces (38) and the second pair of support surfaces (40), wherein the first and second pair of support surfaces (38, 40) are integral with bearing bars (36, 37), one end of the bearing bars (36, 37) is supported by the main housing (46) and an opposite end of the bearing bars (36, 37) is supported by the housing cover (48), the two arms (14, 16) are fixed to each other such that the shift rocker (4) has a U-shape, and the bearing bars (36, 37) extend from the main housing (46) to the housing cover (48) on an inside of the U-shaped shift rocker (4) between the two arms (14, 16).

7. The shift rocker arrangement according to claim 6, wherein the circular pivot bearings (24) have a diameter that is greater than a lateral width of the two arms (14, 16) when viewed from the pivot axis (6).

8. The shift rocker arrangement according to claim 6, wherein the circular pivot bearings (24) are sandwiched between the first pair of support surfaces (38) and the second pair of support surfaces (40) such that the pivot bearings (24) are prevented from moving horizontally and vertically.

9. The shift rocker arrangement according to claim 6, wherein the circular pivot bearings (24) are sandwiched between the first pair of support surfaces (38) and the second pair of support surfaces (40) such that the circular pivot bearings (24) are confined to rotate about the pivot axis (6).

10. The shift rocker arrangement according to claim 6, wherein each of the two arms (14, 16) has one lateral side surface that is coincident with the first of the rounded bearing surfaces (26) and another lateral side surface that is coincident with the second of the rounded bearing surfaces (28).

* * * * *